No. 841,252. PATENTED JAN. 15, 1907.
I. JACKSON.
BELT FASTENER.
APPLICATION FILED MAY 17, 1905.

Witnesses
J. E. Stinkel
B. C. Rust

Inventor
Isaac Jackson
by Foster, Freeman & Watson
Attorneys

UNITED STATES PATENT OFFICE.

ISAAC JACKSON, OF GLOSSOP, ENGLAND.

BELT-FASTENER.

No. 841,252.　　　　Specification of Letters Patent.　　　Patented Jan. 15, 1907.

Application filed May 17, 1905. Serial No. 260,915.

*To all whom it may concern:*

Be it known that I, ISAAC JACKSON, a subject of the King of Great Britain, residing at Glossop, in the county of Derby, England, have invented certain new and useful Improvements in Belt-Fasteners, of which the following is a specification.

My invention relates to belt-fasteners, and has for its object to improve and simplify the construction and operation of such devices, and more particularly to adapt them for use with securing devices which are preferably made of light material and are so constructed and arranged in connection with the plates that they can be readily detached.

Figure 1:
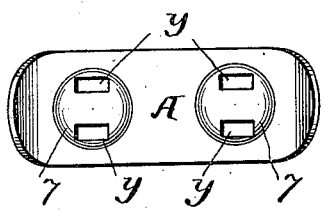
Figure 2:
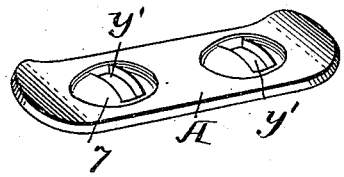
Figure 3:
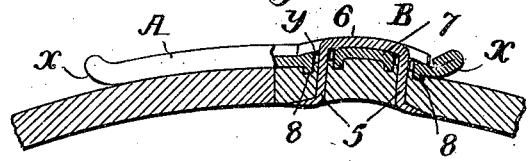
Figure 4:
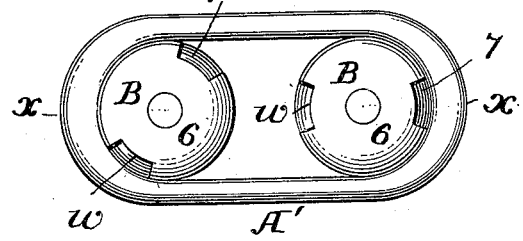
Figure 5:
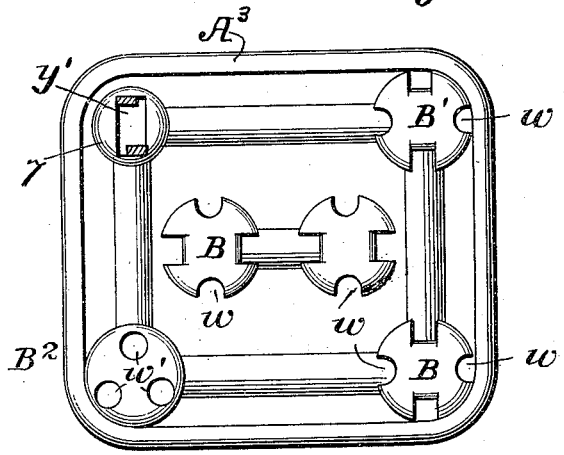

In the accompanying drawings, Figure 1 is a plan view of a plate. Fig. 2 is a perspective view of a different form of plate. Fig. 3 is a view, partially in section, showing the fastener applied to a belt. Fig. 4 is a plan view of the fastener shown in Fig. 3; and Fig. 5 is a plan showing a fastener-plate of greater dimensions and somewhat different construction from those shown in the other figures and with a greater number of securing devices, the securing device being omitted from one portion of the plate.

The belt-fastener consists of a plate, such as is shown at A, A', and A³, and securing devices B B' B², which securing devices may be in the form of rivets having prongs. Whatever may be the outline of the plate, it is preferably of thin material, so as to be light in weight and present as slight a projection above the face of the belt as is possible while securing sufficient strength. The ends of the plate may be curved upward out of the plane of the body, as at $x'$, Fig. 1, or the edges of the plate may be lapped or curled over upon the body of the plate, as shown at $x$, Figs. 3 and 4, so as to lie flat thereon, not only forming ribs which strengthen the plate and guard the edges of the securing devices, but also the edges of the plate are carried inward, so as to prevent them from cutting any object with which they may come in contact. By curving upward the front and rear edges of the plate the deteriorating action of the plate upon the belt in approaching a pulley or otherwise bending the belt in front of the edge is avoided.

The plates are preferably formed with convex portions or domes 7, and these domes are perforated for the passage of such parts of the securing devices as must extend through the plates. These perforations or openings $y$ $y'$ are of such a character that the edges of the prongs of the securing devices are brought against the edges of the openings when the heads of the securing devices are turned, and in Fig. 1 there are shown two adjacent openings $y$, each adapted to receive a single prong of the securing device, and in Figs. 2 and 5 the openings $y'$ are larger and of different shape and adapted to receive two prongs of a securing device.

Various forms of securing devices B may be employed—such, for instance, as are shown in my Patent No. 792,135, of June 13, 1905—and, as best shown in Fig. 3, the securing device is in the form of a rivet having a head 6 with prongs 5 5, which extend through the opening $y$ in the plate and through the material and are shown as clenched or bent outwardly to secure the parts together. The heads of the securing devices or rivets are preferably of thin material, so as to be light in weight and present as slight a projection above the face of the plate as possible, while securing sufficient strength, and the heads are provided with recesses $w$ $w'$, adapted to receive projections upon a tool having a handle, by which sufficient force may be applied to the head to rotate it about its axis in removing the securing device.

By providing the plates with openings $y$ $y'$, through which the prongs 5 of the securing devices or rivets pass, but in which the prongs cannot turn, even though the head is turned, I am enabled by turning the said head to either break it away from the prongs or to so twist the latter and draw upon the same that they are carried outward, and the securing device or rivet is readily detached. In doing this the edges of the prongs bear against the edges of the openings in the plate, and the edges of these openings may be strengthened by forming ribs 8, Fig. 3, which better resist the pressure of the prongs against them in turning the heads and which prevent any rotation of the prongs with the head when the latter is turned by the tool or otherwise in removing the securing device or rivet.

The recesses or openings $w$ $w'$ in the heads of the securing devices may be of any desired number and shape and are shown in Figs. 3 and 4 as at the periphery of the head and in Fig. 5 as at the periphery in some instances and also within the head.

What I claim is—

1. In a belt-fastener, the combination with a perforated plate, of securing devices having prongs arranged to engage the edges of the perforations in the plate and having heads provided with recesses adapted to be engaged by a device for turning the head on its axis.

2. A belt-fastener comprising a perforated plate and rivets having prongs adapted to pass through the perforations in the plate, and to engage the edge or edges thereof, and be held thereby from turning therein, and with heads having recesses at their edges adapted to be engaged by a device for turning the head on its axis.

In testimony whereof I have signed my name to this specification in the presence of two subscribing witnesses.

ISAAC JACKSON.

Witnesses:
ARTHUR L. BRYANT,
THOS. HOWE.